(12) United States Patent
Boevers

(10) Patent No.: US 6,974,021 B1
(45) Date of Patent: Dec. 13, 2005

(54) ADJUSTABLE GRAIN SPOUT ASSEMBLY

(75) Inventor: Craig Boevers, 2231 Navaho Ave., Tripoli, IA (US) 50676

(73) Assignee: Craig Boevers, Tripoli, IA (US)

( * ) Notice: Subject to any disclaimer, the term of this patent is extended or adjusted under 35 U.S.C. 154(b) by 43 days.

(21) Appl. No.: 10/853,045

(22) Filed: May 25, 2004

(51) Int. Cl.[7] ............................................. B65G 65/34
(52) U.S. Cl. ................................. 198/550.2; 198/671
(58) Field of Search ............................. 193/16, 21, 22, 193/24; 414/519, 523; 198/550.2, 668, 671

(56) References Cited

U.S. PATENT DOCUMENTS

| 215,818 | A | | 5/1879 | Hough |
| 252,376 | A | | 1/1882 | Hinckley |
| 326,964 | A | | 9/1885 | Fisk |
| 420,131 | A | | 1/1890 | Walrath |
| 608,585 | A | | 8/1898 | Dentler |
| 1,268,219 | A | * | 6/1918 | Cooley ........................ 193/23 |
| 1,719,788 | A | | 7/1929 | Snyder |
| 1,798,231 | A | | 3/1931 | Thiemann |
| 2,558,006 | A | | 6/1951 | Shriver et al. |
| 2,664,189 | A | | 12/1953 | Hager |
| 2,667,028 | A | | 1/1954 | Weishaar |
| 2,724,516 | A | | 11/1955 | Weishaar |
| 3,126,109 | A | | 3/1964 | Loschen |
| 3,147,837 | A | * | 9/1964 | Brotherton .................... 193/17 |
| 3,575,306 | A | | 4/1971 | Obermeyer |
| 3,717,272 | A | | 2/1973 | Charter et al. |
| 3,774,741 | A | * | 11/1973 | Johnson ....................... 193/10 |
| 3,844,433 | A | | 10/1974 | Laajala |
| 3,860,010 | A | | 1/1975 | Anderson et al. |
| 4,332,261 | A | | 6/1982 | Webster |
| 4,540,086 | A | | 9/1985 | David et al. |
| 4,699,218 | A | | 10/1987 | Schwitters |
| 4,727,977 | A | * | 3/1988 | Arnson .................. 198/550.01 |
| 4,875,569 | A | | 10/1989 | Oury et al. |
| 4,923,358 | A | | 5/1990 | Van Mill |
| 5,127,507 | A | * | 7/1992 | McDermott ................. 193/2 R |
| 5,167,581 | A | | 12/1992 | Haag |
| 5,253,746 | A | * | 10/1993 | Friesen et al. ........... 198/550.2 |
| 5,465,829 | A | * | 11/1995 | Kruse .......................... 198/538 |
| 5,498,119 | A | * | 3/1996 | Faivre ......................... 414/528 |
| 5,746,303 | A | | 5/1998 | Niewold |
| 5,927,461 | A | * | 7/1999 | Jamieson ....................... 193/6 |
| 6,296,435 | B1 | * | 10/2001 | Wood et al. ................ 414/523 |
| 6,497,546 | B2 | * | 12/2002 | Wood et al. ................ 414/523 |
| 6,591,974 | B2 | * | 7/2003 | Tofin et al. ................. 198/671 |
| 6,606,844 | B2 | | 8/2003 | Dillon et al. |

* cited by examiner

*Primary Examiner*—Douglas Hess

(57) ABSTRACT

An adjustable assembly for discharging grain from a grain handling implement having a control rod with a swivel link that is mounted to the body of the grain implement and is operatively connected to a discharge spout to rotate the spout in relation to a discharge end of the grain implement.

6 Claims, 4 Drawing Sheets

ADJUSTABLE GRAIN SPOUT ASSEMBLY

BACKGROUND OF THE INVENTION

This invention is directed toward a device for distributing grain, and more specifically, to an assembly for adjusting the spout of a grain dispensing device. When loading grain into a grain truck from a grain handling implement such as an auger, a truck must be positioned so that the downspout of the auger is centered in relation to the bed of the truck in order to allow the maximum amount of grain to be placed into the bed of the truck. The truck must additionally be centered so that when the grain falls into truck bed, the grain is evenly dispersed over the entire bed. If mispositioned, the grain will not flow evenly into the truck bed, hence, not allowing the optimal amount of grain for transport. Consequently, to ensure that the auger downspout is centered, usually a driver of a truck must have a co-worker direct the truck to a correct position or must adjust the position of the truck several times until centered. The repositioning of the truck takes time and requires additional manpower. If the truck is not properly positioned, grain can be lost or a maximum load of grain will not be transported. This loss of time, grain, and capacity result in increased costs for the shipment of the grain.

Many attempts in the art have been made to attach an assembly to the grain handling implement in an attempt to adjust the flow of grain through the discharge end of the auger to solve these problems. Many of these devices have included assemblies that are complicated requiring many parts and complex operations. Other devices require elongated bent spout attachments that are sensitive to movement and thus, difficult to control. Additionally, because of complex parts, assembly and disassembly of the devices can be very difficult and time consuming.

There is a need in the art for an improved assembly for adjusting the disbursement of grain from a grain handling device. Specifically, there is a need in the art for an assembly that adjusts the disbursement of grain from a grain handling implement that can be done by an individual at ground level and that uses a simple assembly that is easy to manufacture and operate. Further, there is a need in the art for a device that will adjust the dispensing end of a grain handling implement 360 degrees.

Consequently, a primary object of the present invention is to provide an assembly for adjusting the disbursement of grain from a grain handling implement that is easy to operate.

Another object of the present invention is to provide an assembly for adjusting the disbursement of grain from a grain handling implement that minimizes the number of parts and is economical to manufacture.

A further object of the present invention is to provide an assembly for adjusting the disbursement of grain from a grain handling implement that pivots the discharge spout 360 degrees.

Yet another object of the present invention is to provide an assembly for adjusting the disbursement of grain from a grain handling implement that is easy to assemble and disassemble on multiple grain handling implements.

These and other objects, features, or advantages of the present invention will become apparent from the specification and the claims.

BRIEF SUMMARY OF THE INVENTION

The present invention is for an assembly for adjusting the disbursement of grain from a grain handling implement that has a shaft and a grain dispensing end. A discharge spout is pivotably placed on the dispensing end of the grain handling implement and is adjusted by a control rod mounted to and extending substantially along the length of the grain handling implement. The control rod is operatively connected to the discharge spout by a swivel link. Thus, movement of the control rod toward and away from the dispensing end of the grain handling implement or rotation of the control rod will cause the discharge spout to be pivoted in multiple directions.

DESCRIPTION OF THE PREFERRED EMBODIMENTS OF THE INVENTION

Figure 1:
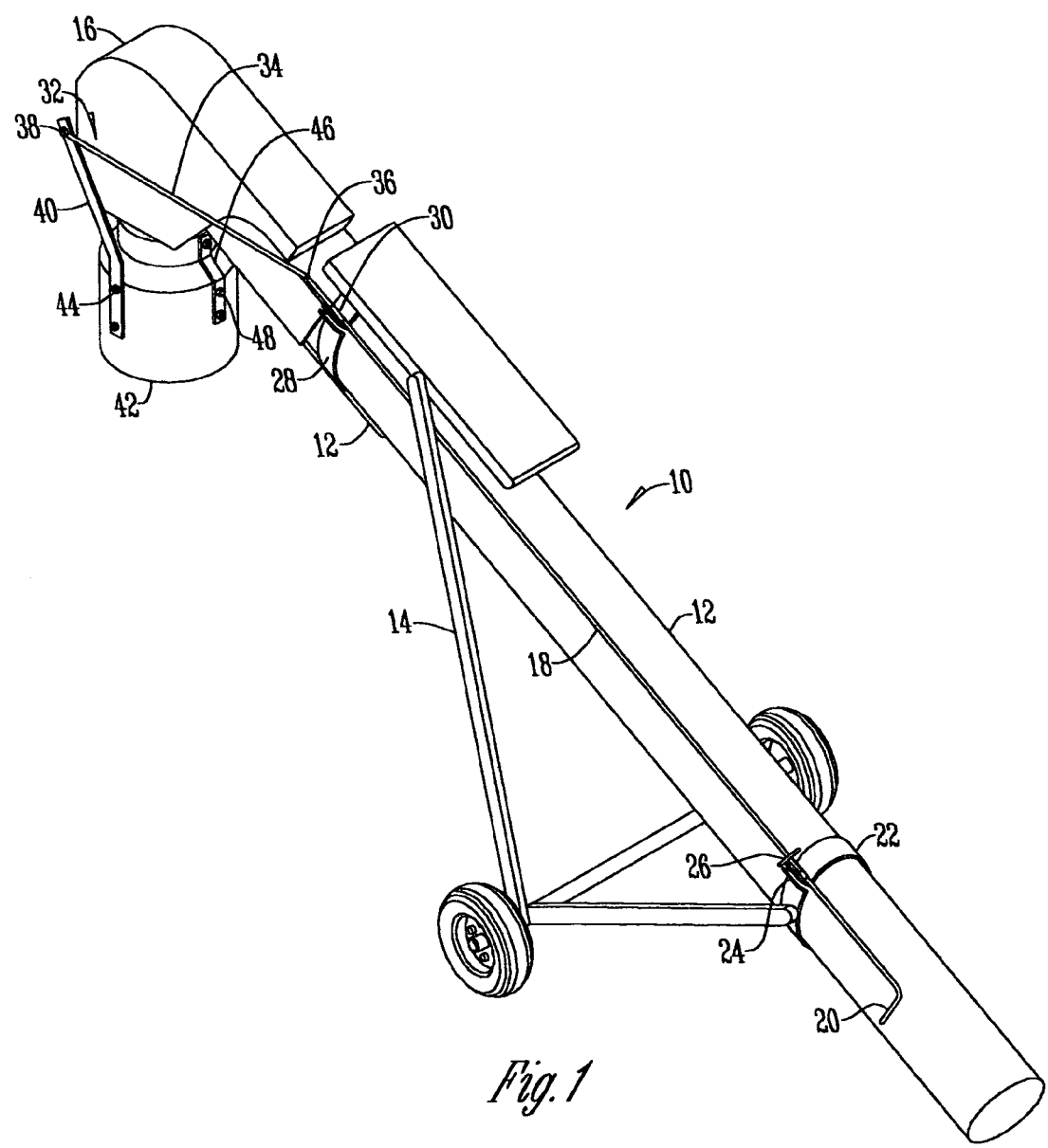
FIG. 1 is a perspective view of the assembly for adjusting the disbursement of grain on a grain handling implement.
Figure 2:
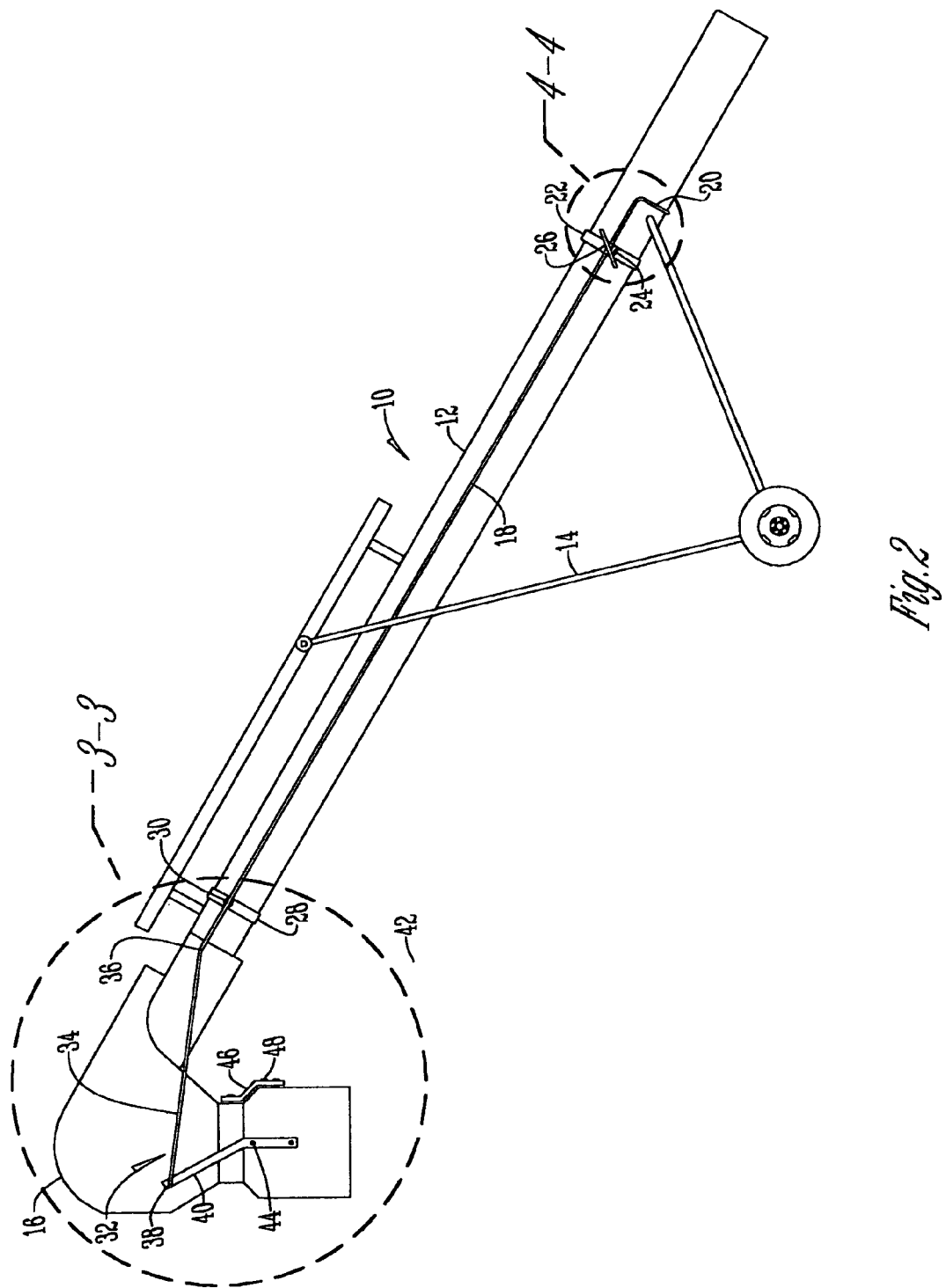
FIG. 2 is side view of an assembly for adjusting the disbursement of grain on a grain handling implement.
Figure 3:
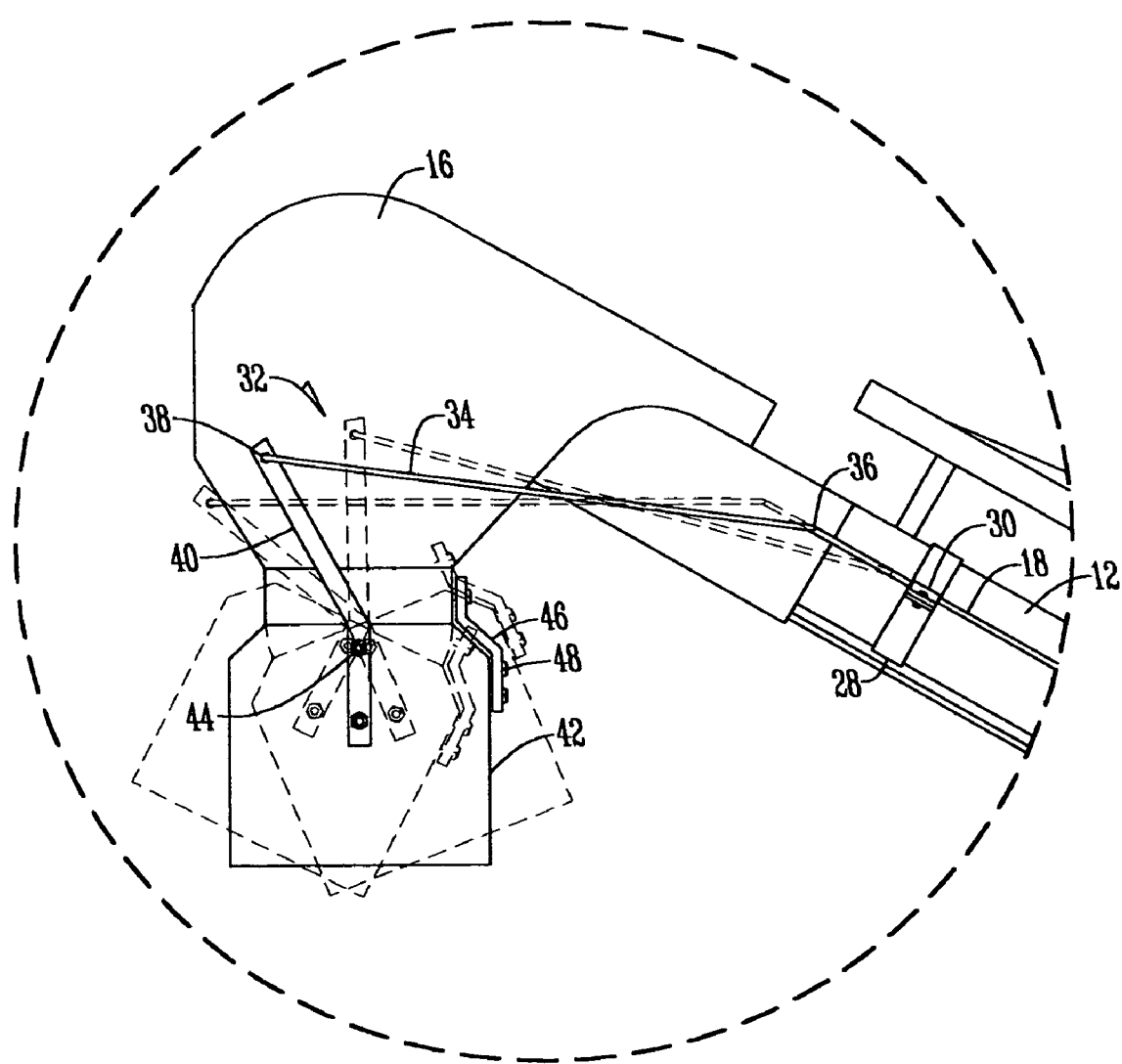
FIG. 3 is an exploded view of the discharge spout of the assembly for adjusting the disbursement of grain from a grain handling implement with hidden lines showing the movement of the spout.
Figure 4:
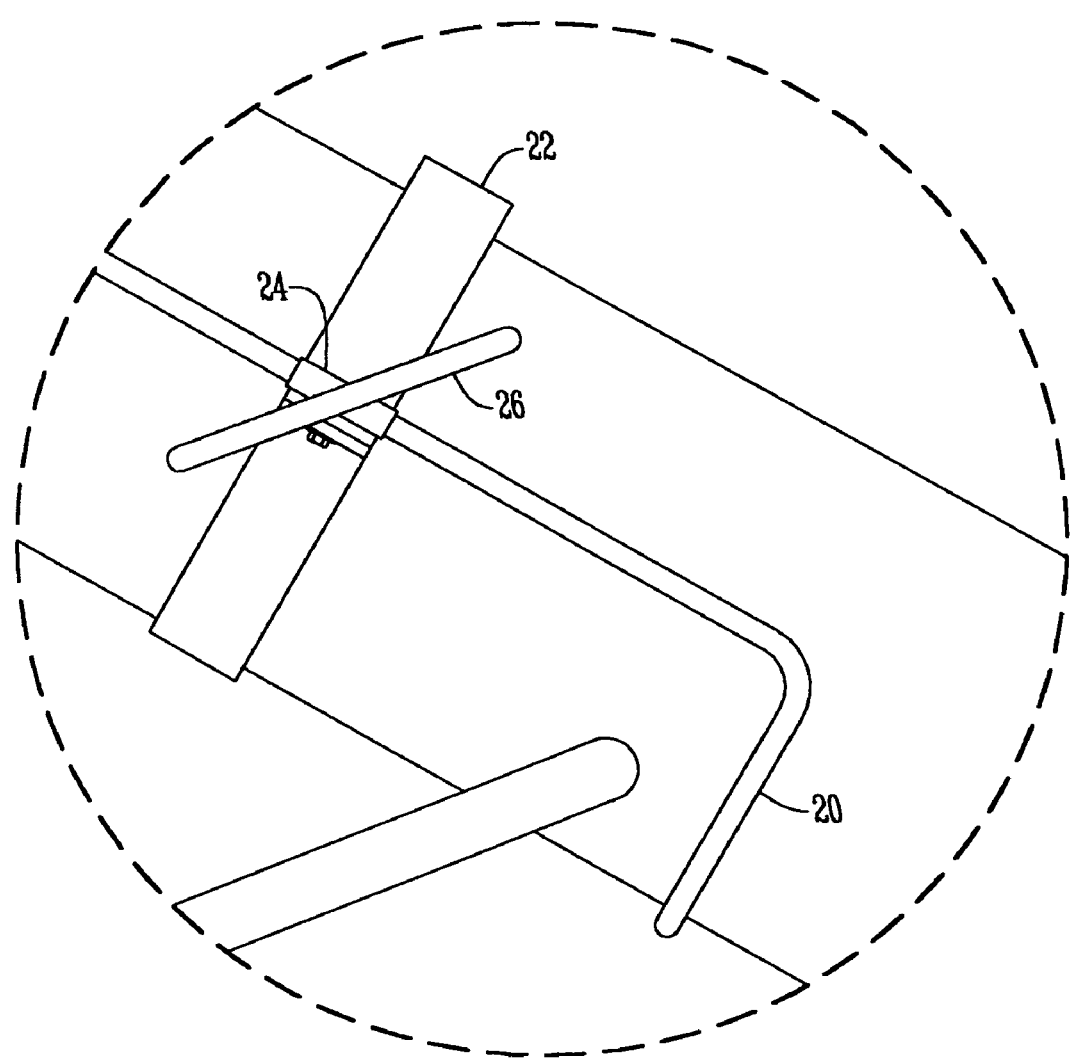
FIG. 4 is an exploded view of the mounting member and locking mechanism of the present invention.

A grain handling implement 10 seen in FIG. 1 has an elongated shaft or body 12 mounted on supports 14. The body 12 carries grain to a discharge end 16. The grain handling implement can be an auger, conveyor, or any similar type grain handling device. The adjusting assembly of the present invention comprises an elongated control rod 18 with a handle 20 at a first end and is mounted along the grain handling implement body 12. The control rod 18 is preferably mounted on the body 12 of the grain handling implement with a first mounting member 22 such as a pipe clamp. First mounting member 22 has a first sleeve 24 through which the control rod 18 extends and a locking mechanism 26 that will maintain the control rod 18 in a desired position (FIG. 4). Along the body 12 of the grain handling implement 10 is a second mounting member 28 having a second sleeve 30 through which the control rod 18 extends, the mounting member 28 supporting the control rod 18 near the discharge end of the body 12 of the grain handling implement 10. The control rod 18 terminates in a swivel link 32 that is comprised of a first member 34 that has a first pivot point 36. The first member 34 is pivotably connected to a second member 40 at a second pivot point 38 that pivotally connects the first member 34 to a second member 40. The second member 40 extends transversely in relation to the first member 34 and is attached to a discharge spout 42 at a third pivot point 44. The discharge spout 42 fits over the dispensing end 16 of the grain handling implement 10 to create a seal between the dispensing end 16 and the spout 42. The spout generally is an elongated cylinder and alternatively can be formed in a funnel shape. The second member 40 is secured to the spout 42 in any conventional manner such as with nuts and bolts. An additional brace member 46 is secured to the dispensing end 16 such that the spout 42 is moveable about pivot point 48. Brace member 46 provides additional support when rotating the spout 42 transversely to second member 40.

In operation, when the locking mechanism 26 is disengaged, the control rod 18 can be moved towards the dispensing end 16 of the grain handling implement 10. By moving the control rod 18 toward the dispensing end 16 of the grain handling implement 10 the swivel link 32 of the control rod 18 extends outwardly from the dispensing end 16 causing first member 34 to rotate about pivot point 36 in a counterclockwise direction. Consequently, the first member 34 of the swivel link 32 extends outwardly from the dispensing end 16 pushing the second member 40 outwardly at pivot point 38 such that the second member 40 rotates about pivot point 44 in a counterclockwise direction causing spout 42 to rotate toward the elongated body 12. When the control rod 18 is pulled away from the dispensing end 16 of the grain handling implement 10, the first member 34 moves toward the body 12 about pivot point 36 in a clockwise direction. Consequently, the second member 40 is pulled toward the body 12 at pivot point 38 causing the second member 34 to rotate about pivot point 44 in a clockwise direction, which in turn moves the spout 42 away from the body 12.

Additionally, the control rod 18 may be rotated in a clockwise or counterclockwise direction causing the swivel link 32 to rotate toward or away from the body 12 of the grain handling implement 10. The rotation of the rod will move the grain spout 42 in a plane transverse to the body 12 of the grain handling implement 10 about pivot point 48. Thus, through the movement of rod 18 along the body 12, as well as the rotation of the rod clockwise or counterclockwise, the spout can be moved in any direction.

The assembly disclosed allows a worker to adjust the angle at which grain is dispensed from the discharge end 16 of a grain handling implement 10 by standing next to the grain handling implement 10 and using the assembly provided. Thus, a grain truck no longer has to be repositioned underneath the discharge end 16 of a grain handling implement 10 in order to be properly loaded.

All of the objectives of the present invention have been met. The device is of simple construction, the spout can be rotated in a plurality of directions, and grain can be dispensed to different areas of the truck bed without repositioning the truck.

It will be appreciated by those skilled in the art that other various modifications could be made to the device without the parting from the spirit in scope of this invention. All such modifications and changes fall within the scope of the claims and are intended to be covered thereby.

What is claimed is:

1. An assembly for adjusting the disbursement of grain from a grain handling implement having a shaft and a grain dispensing end, comprising:
    a discharge spout pivotably mounted to the dispensing end of the grain handling implement;
    a control rod mounted to and extending substantially along the length of the grain handling implement and having a swivel link that is operatively connected to the discharge spout; and
    wherein the swivel link comprises a first member pivotally connected to the control rod; and a second member pivotably connected to the first member at one end and pivotally connected to the discharge spout at an opposite end.

2. The assembly of claim 1 wherein the first member extends transversely in relation to the control rod.

3. The assembly of claim 1 wherein the discharge spout pivots about a single rotational plane.

4. The assembly of claim 1 wherein the discharge spout extends over the dispensing end of the grain handling implement to create a seal between the dispensing end of the grain handling implement and the discharge spout.

5. The assembly of claim 1 further comprising a means for locking the control rod in a selected position.

6. The assembly of claim 5 wherein the locking means further comprises a locking handle that engages the control rod through a sleeve of a bracket.

* * * * *